(12) United States Patent
Hara et al.

(10) Patent No.: US 8,764,918 B2
(45) Date of Patent: Jul. 1, 2014

(54) HIGH STRENGTH STEEL PIPE FOR LINE PIPE SUPERIOR IN LOW TEMPERATURE TOUGHNESS AND HIGH STRENGTH STEEL PLATE FOR LINE PIPE AND METHODS OF PRODUCTION OF THE SAME

(75) Inventors: Takuya Hara, Tokyo (JP); Hitoshi Asahi, Tokyo (JP); Yoshio Terada, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 921 days.

(21) Appl. No.: 12/308,677

(22) PCT Filed: Jul. 2, 2007

(86) PCT No.: PCT/JP2007/063615
§ 371 (c)(1),
(2), (4) Date: Dec. 19, 2008

(87) PCT Pub. No.: WO2008/004680
PCT Pub. Date: Jan. 10, 2008

(65) Prior Publication Data
US 2010/0236668 A1 Sep. 23, 2010

(30) Foreign Application Priority Data
Jul. 4, 2006 (JP) ................... 2006-184676

(51) Int. Cl.
C22C 38/00 (2006.01)
C21D 9/08 (2006.01)
C21D 8/04 (2006.01)
C22C 38/04 (2006.01)
C22C 38/12 (2006.01)
C22C 38/14 (2006.01)

(52) U.S. Cl.
USPC ........... 148/330; 148/521; 148/546; 420/120; 420/121; 420/124; 420/126; 420/127

(58) Field of Classification Search
USPC .......... 148/330, 519, 521, 546; 420/120, 121, 420/123, 124, 126, 127
See application file for complete search history.

(56) References Cited

U.S. PATENT DOCUMENTS

2004/0031544 A1 * 2/2004 Hara et al. ..................... 148/521

FOREIGN PATENT DOCUMENTS

| EP | 0 757 113 | 2/1997 |
|---|---|---|
| EP | 1 375 681 | 1/2004 |
| EP | 1 978 121 | 10/2008 |
| EP | 2 105 513 | 9/2009 |
| JP | 62-004826 | 1/1987 |
| JP | 10-298707 | 11/1998 |
| JP | 2000-256777 | 9/2000 |
| JP | 2001-303191 | 10/2001 |
| JP | 2001-335884 A | 12/2001 |
| JP | 2004-035925 | 2/2004 |
| JP | 2004-052104 | 2/2004 |
| JP | 2004-068055 | 3/2004 |
| JP | 2004-099930 | 4/2004 |
| JP | 2006-28627 | 2/2006 |
| WO | WO 2008/069335 | 6/2008 |

OTHER PUBLICATIONS

International Search Report dated Oct. 9, 2007 issued in corresponding PCT Application No. PCT/JP2007/063615.
Office Action in Japanese Patent Application No. 2006-184676 dated Nov. 15, 2011, 3 pages.

* cited by examiner

*Primary Examiner* — Roy King
*Assistant Examiner* — Caitlin Kiechle
(74) *Attorney, Agent, or Firm* — Kenyon & Kenyon LLP (57) ABSTRACT

The present invention provides high strength steel pipe for line pipe superior in low temperature toughness suppressed in drop of toughness of the HAZ and a method of production of the same, more particularly high strength steel plate for line pipe used as a material for high strength steel pipe for line pipe and a method of production of the same, in particular high strength steel pipe for line pipe superior in low temperature toughness characterized in that the chemical compositions of the base metal is, by mass %, C: 0.020 to 0.080%, Si: 0.01 to 0.50%, Mo: 0.01 to 0.15%, Al: 0.0005 to 0.030%, and Nb: 0.0001 to 0.030% contained in a range of C+0.25Si+0.1Mo+Al+Nb: 0.100% or less and the mixture of austenite and martensite present along prior austenite grain boundaries of the reheated part of the heat affected zone has a width of 10 μm or less and a length of 50 μm or less.

12 Claims, 2 Drawing Sheets

HIGH STRENGTH STEEL PIPE FOR LINE PIPE SUPERIOR IN LOW TEMPERATURE TOUGHNESS AND HIGH STRENGTH STEEL PLATE FOR LINE PIPE AND METHODS OF PRODUCTION OF THE SAME

TECHNICAL FIELD

The present invention relates to steel pipe for line pipe suitable for a pipeline for transporting crude oil, natural gas, etc., a steel plate material for the same, and methods of production of the same.

BACKGROUND ART

As steel pipe for line pipe used for the trunk lines of pipelines important as a long distance transport method of crude oil, natural gas, etc., high strength, high toughness steel pipe for line pipe has been proposed (for example, Japanese Unexamined Patent Publication No. 62-4826A). Up to now, commercialization of high strength steel pipe of up to X80 in the American Petroleum Institute (API) standards has been pushed. In recent years, however, further higher strength line pipe has been demanded due to (1) the improvement in transport efficiency due to higher pressures and (2) the improvement in on-site installation efficiency due to the reduction of the outside diameter and weight of line pipe.

For example, if using X120 grade line pipe having a 900 MPa or higher tensile strength, it is possible to increase the internal pressure, that is, the pressure of the crude oil or natural gas, to about double that of 65 grade line pipe, so about double the amount of crude oil or natural gas can be transported. Further, if raising the strength of the line pipe to improve the resistance to internal pressure, compared with making the thickness greater, it becomes possible to cut material costs, transport costs, and on-site welding and installation costs and possible to greatly save on pipeline laying costs.

Further, pipelines are often laid in artic regions, so have to be superior in low temperature toughness. Furthermore, at the time of installation, the ends of the line pipes are connected, so superior on-site weldability is also demanded. To satisfy this demand, steel pipe for high strength line pipe with a base metal of a microstructure mainly composed of a mixed structure of bainite and martensite suitable for X120 grade line pipe higher in strength than the steel pipe for line pipe proposed in Japanese Unexamined Patent Publication No. 62-4826A has been proposed (for example, Japanese Unexamined Patent Publication No. 10-298707A, Japanese Unexamined Patent Publication No. 2001-303191A, and Japanese Unexamined Patent Publication No. 2004-52104A).

Furthermore, when producing steel pipe, steel plate is shaped into a tube and the seam portions are seam welded. When toughness and productivity are demanded as with steel pipe for high strength line pipe, submerged arc welding from the inner surface and outer surface is preferable for the seam welding. When welding a steel material a plurality of times in this way, the heat affected zone (HAZ) coarsened by the input heat from the earlier welding is reheated by the input heat of the later welding and the toughness drops.

It is known that the drop in toughness of this reheated HAZ (reheated HAZ) is due to the formation of a mixture of martensite and austenite (MA). To solve this problem, some of the inventors proposed the method of suppressing the drop in toughness by reducing the area ratio of the MA of the reheated HAZ and suppressing hardening of the reheated HAZ (for example, Japanese Unexamined Patent Publication No. 2004-68055A and Japanese Unexamined Patent Publication No. 2004-99930A).

However, the method proposed in Japanese Unexamined Patent Publication No. 2004-68055A heat treats the weld zone of the steel pipe. For this reason, a method not requiring heat treatment of the weld zone and, in the case of heat treatment, technology for improving the toughness at a low temperature is being demanded. Further, the method proposed in Japanese Unexamined Patent Publication No. 2004-99930A requires control of the cooling rate after welding. Depending on the production conditions, it is sometimes difficult to limit the cooling rate of the weld zone. For this reason, technology for improving the reheated HAZ toughness without relying on the cooling rate of the weld zone is also being demanded.

DISCLOSURE OF INVENTION

The present invention provides an API standard X120 grade high strength steel pipe for line pipe suppressing the drop of the toughness of the reheated HAZ and superior in low temperature toughness and a method of production of the same and, furthermore, high strength steel plate for line pipe able to be used as a material for high strength steel pipe for line pipe and methods of production of the same.

The inventors engaged in in-depth research focusing on the amounts of C, Si, Al, Nb, and Mo assisting the formation of MA for obtaining high strength steel pipe for line pipe having a tensile strength in the circumferential direction of 900 MPa or more and a superior low temperature toughness, in particular, low temperature toughness of the HAZ. As a result, they obtained the discovery that by controlling the amounts of C, Si, Al, Nb, and Mo to suitable ranges, the formation of MA at the prior austenite grain boundary of the reheated HAZ is suppressed and the low temperature toughness of the HAZ is improved. The present invention was made based on this discovery and has as its gist the following:

(1) A high strength steel pipe for line pipe superior in low temperature toughness characterized by comprising a steel plate shaped into a tube with seam portions of the steel plate welded by one layer each at the inner side and outer side, a base metal of the steel pipe having a chemical composition containing, by mass %, C: 0.020 to 0.080%, Si: 0.01 to 0.50%, Mo: 0.01 to 0.15%, Al: 0.0005 to 0.030%, and Nb: 0.0001 to 0.030% in a range of C+0.25Si+0.1Mo+Al+Nb: 0.100% or less, further containing, Mn: 1.50 to 2.50%, Ti: 0.003 to 0.030%, and B: 0.0001 to 0.0030%, and limiting P: 0.020% or less and S: 0.0030% or less, with the balance of Fe and unavoidable impurities, the mixture of austenite and martensite present along prior austenite grain boundaries of the reheated parts of the heat affected zone having a width of 10 μm or less and a length of 50 μm or less.

(2) A high strength steel pipe for line pipe superior in low temperature toughness as set forth in (1) characterized in that the base metal has a tensile strength in the circumferential direction of 900 MPa or more.

(3) A high strength steel pipe for line pipe superior in low temperature toughness as set forth in (1) or (2) characterized in that the weld metal has a chemical compositions containing, by mass %, C: 0.010 to 0.100%, Si: 0.01 to 0.50%, Mn: 1.00 to 2.00%, Ni: 1.30 to 3.20%, Al: 0.0005 to 0.100%, Ti: 0.003 to 0.050%, and O: 0.0001 to 0.0500%, further containing a total of one or more of Cr, Mo, and V: 1.00 to 2.50%, limiting P: 0.020% or less and S: 0.0100% or less with the balance of Fe and unavoidable impurities.

(4) A high strength steel pipe for line pipe superior in low temperature toughness as set forth in (3) characterized in that the weld metal has a chemical compositions containing, by mass %, B: 0.0001 to 0.0050%.

(5) A high strength steel pipe for line pipe superior in low temperature toughness as set forth in any one of (1) to (4) characterized in that the base metal has a chemical compositions containing, by mass %, one or both of Cu: 0.05 to 1.50% and Ni: 0.05 to 5.00%.

(6) A high strength steel pipe for line pipe superior in low temperature toughness as set forth in any one of (1) to (5) characterized in that the base metal has a chemical compositions containing, by mass %, one or more of Cr: 0.02 to 1.50%, W: 0.01 to 2.00%, V: 0.010 to 0.100%, Zr: 0.0001 to 0.0500%, and Ta: 0.0001 to 0.0500%.

(7) A high strength steel pipe for line pipe superior in low temperature toughness as set forth in any one of (1) to (6) characterized in that the base metal has a chemical compositions containing, by mass %, one or more of Mg: 0.0001 to 0.0100%, Ca: 0.0001 to 0.0050%, REM: 0.0001 to 0.0050%, Y: 0.0001 to 0.0050%, Hf: 0.0001 to 0.0050%, and Re: 0.0001 to 0.0050%.

(8) A high strength steel plate for line pipe superior in low temperature toughness characterized by comprising high strength steel plate for line pipe used as a material for high strength steel pipe for line pipe superior in low temperature toughness as set forth in any one of (1) to (4) and having a chemical compositions containing, by mass %, C: 0.020 to 0.080%, Si: 0.01 to 0.50%, Mo: 0.01 to 0.15%, Al: 0.0005 to 0.030%, and Nb: 0.0001 to 0.030% in a range of C+0.25Si+0.1Mo+Al+Nb: 0.100% or less and further containing Mn: 1.50 to 2.50%, Ti: 0.003 to 0.030%, and B: 0.0001 to 0.0030%, and limiting P: 0.020% or less and S: 0.0030% or less with a balance of Fe and unavoidable impurities.

(9) A high strength steel plate for line pipe superior in low temperature toughness as set forth in (8) characterized by comprising high strength steel plate for line pipe used as a material for high strength steel pipe for line pipe superior in low temperature toughness as set forth in (5) and having a chemical compositions containing, by mass %, one or both of Cu: 0.05 to 1.50% and Ni: 0.05 to 5.00%.

(10) A high strength steel plate for line pipe superior in low temperature toughness as set forth in (8) or (9) characterized by comprising high strength steel plate for line pipe used as a material for high strength steel pipe for line pipe superior in low temperature toughness as set forth in (6) and having a chemical compositions containing, by mass %, one or more of Cr: 0.02 to 1.50%, W: 0.01 to 2.00%, V: 0.010 to 0.100%, Zr: 0.0001 to 0.0500%, and Ta: 0.0001 to 0.0500%.

(11) A high strength steel plate for line pipe superior in low temperature toughness as set forth in any one of (8) to (10) characterized by comprising high strength steel plate for line pipe used as a material for high strength steel pipe for line pipe superior in low temperature toughness as set forth in (7) and having a chemical compositions containing, by mass %, one or more of Mg: 0.0001 to 0.0100%, Ca: 0.0001 to 0.0050%, REM: 0.0001 to 0.0050%, Y: 0.0001 to 0.0050%, Hf: 0.0001 to 0.0050%, and Re: 0.0001 to 0.0050%.

(12) A method of production of a high strength steel plate for line pipe superior in low temperature toughness as set forth in any one of (8) to (11), said method of production of a high strength steel plate for line pipe superior in low temperature toughness characterized by melting and casting steel comprising the chemical compositions as set forth in any one of (8) to (11), reheating a steel slab to 1000° C. or more, hot rolling by a reduction ratio in a nonrecrystallization temperature region of 3 or more, and stopping water cooling at 500° C. or lower.

(13) A method of production of high strength steel pipe for line pipe superior in low temperature toughness characterized by comprising a method of production of high strength steel pipe for line pipe superior in low temperature toughness as set forth in any one of (1) to (7) and by shaping the high strength steel plate for line pipe superior in low temperature toughness produced by the method as set forth in any one of (8) to (11) to a tube, welding the seam portions, and then enlarging it.

(14) A method of production of high strength steel pipe for line pipe superior in low temperature toughness as set forth in (13) characterized by shaping the steel plate into a tube by a UO process, welding the seam portions from the inner side and outer side by submerged arc welding, then enlarging the pipe.

(15) A method of production of a high strength steel pipe for line pipe superior in low temperature toughness as set forth in any one of (12) to (14) characterized in that a welding wire used for the submerged arc welding as set forth in (14) has a chemical compositions containing, by mass %, C: 0.01 to 0.12%, Si: 0.05 to 0.50%, Mn: 1.00 to 2.50%, and Ni: 2.00 to 8.50%, further containing one or more of Cr, Mo, and V in a range of Cr+Mo+V: 1.00 to 5.00% with a balance of Fe and unavoidable impurities.

(16) A method of production of high strength steel pipe for line pipe superior in low temperature toughness as set forth in (15) characterized in that the chemical compositions of the welding wire is, by mass %, B: 0.0001 to 0.0050%.

(17) A method of production of high strength steel pipe for line pipe superior in low temperature toughness as set forth in any one of (12) to (16) characterized by heat treating the weld zone and heat affected zone after welding and before pipe expansion.

(18) A method of production of high strength steel pipe for line pipe superior in low temperature toughness as set forth in any one of (13) to (17) characterized in that the heating temperature when heat treating the weld zone and heat affected zone is 200 to 500° C.

BEST MODE FOR CARRYING OUT THE INVENTION

Figure 1:
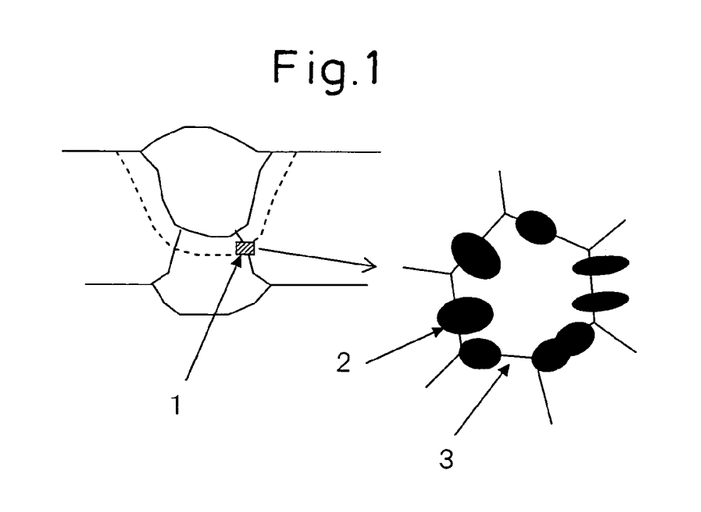
FIG. 1 is a schematic view of a reheated HAZ.

First, the low temperature toughness of the HAZ will be explained. As shown schematically in FIG. 1, the reheated HAZ 1 is the location where the weld metal and HAZ near the weld line of the earlier welding are reheated by later welding. While differing somewhat by the input heat at the time of welding, normally the HAZ is the location within 10 mm from the weld line. At the reheated HAZ, there is sometimes coarse MA 2 along prior austenite grain boundaries 3. If this becomes the starting point of fracture, the low temperature toughness remarkably falls. For this reason, it is difficult to improve the toughness of the HAZ at the part of one-half of the thickness of the steel pipe for high strength line pipe. In particular, when providing a notch at a location corresponding to the reheated HAZ, for example, a position 1 mm or 2 mm from the weld line, the Charpy absorption energy at −40° C. sometimes becomes less than 50J.

The inventors engaged in intensive research to clarify the relationship between the effects of elements assisting the formation of MA on the low temperature toughness of the heat affected zone, that is, the amounts of addition of C, Si, Al, Nb, and Mo, and the toughness of the HAZ. First, they took samples from steel materials comprised of various chemical compositions and performed heat treatment simulating the heat history of the reheated HAZ (reheated HAZ reproduction test). This involves heating the steel material to 1400° C. and immediately cooling it to room temperature and further heating it to 750° C. and immediately cooling it to room temperature during which making the cooling rate from 750° C. to 500° C. at the time of cooling 5 to 10° C./s. The inventors took V-notch test pieces from the steel materials after the reheated HAZ reproduction test based on JIS Z 2242 and ran Charpy impact tests at −40° C. and −60° C. The results of the toughness evaluated by the reheated HAZ reproduction test are shown in FIG. 2.

Figure 2:
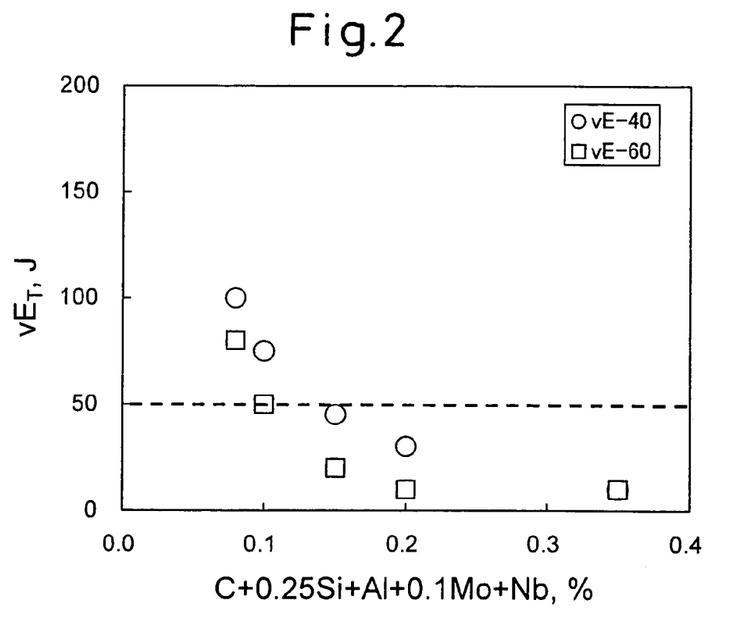
FIG. 2 is a view showing the effects of the chemical compositions on the toughness of the reheated HAZ.

FIG. 2 shows the relationship between the amount of C+0.25Si+0.1Mo+Al+Nb and the Charpy absorption energy at −40° C. and −60° C. of the reheated HAZ obtained by the simulation tests. From FIG. 2, it becomes clear that if possible to suppress the amount of C+0.25Si+0.1Mo+Al+Nb to 0.100% or less, the Charpy absorption energy of the reheated HAZ at −40° C. and −60° C. becomes 50J or more. Next, the inventors investigated the effects of the amounts of addition of C, Si, Al, Nb, and Mo on the formation of MA at the reheated HAZ. In the same way as evaluation of the low temperature toughness, they took samples from steel materials subjected to the reheated HAZ reproduction test, mechanically polished and Nital etched them, then observed them by a scanning electron microscope (SEM). In this observation by an SEM, the MA present along prior austenite grain boundaries were white overall, so could be discerned. The inventors measured the size of the MA formed along prior austenite grain boundaries and as a result learned that under conditions where the toughness evaluated by the reheated HAZ reproduction test is good, the MA has a width of 10 μm or less and a length of 50 μm or less.

Based on the above discoveries, the inventors engaged in further studies and as a result confirmed that if suppressing the amount of C to 0.080% or less, preferably 0.060% or less, Si to 0.50% or less, Mo to 0.15% or less, and Al and Nb to 0.030% or less and making the total of the C+0.25Si+0.1Mo+Al+Nb 0.100% or less, the coarsening of the MA formed along the coarsened prior austenite grain boundaries in the reheated HAZ is suppressed and the Charpy absorption energy at −40° C. and 60° C. is improved to 50J or more.

Figure 3:
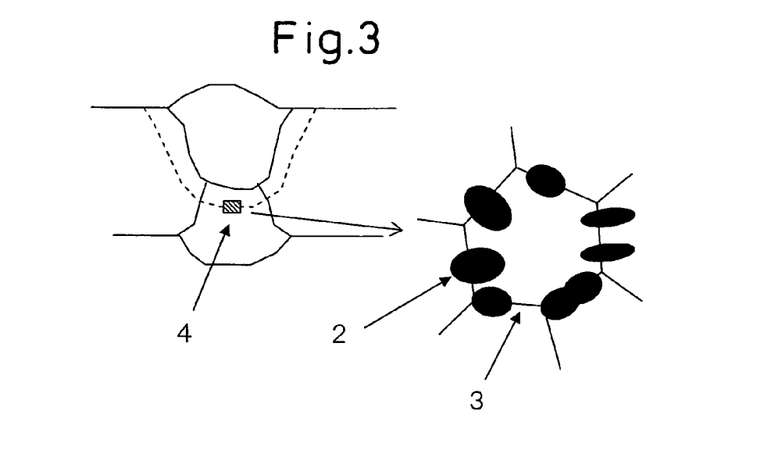
FIG. 3 is a schematic view of a reheated HAZ of a weld metal.

The inventors studied the toughness of the reheated weld metal in the same way as the reheated HAZ. The reheated weld metal, as shown schematically in FIG. 3, is the location where the weld metal at the center part in the circumferential direction formed by earlier welding is reheated by later welding. The reheated weld metal 4, while differing somewhat by the input heat at the time of welding, is usually the location within 5 mm distance from the weld line of the later welding at the center part in the circumferential direction formed by earlier welding.

In the reheated weld metal as well, in the same way as the reheated HAZ, there is coarse MA present along prior austenite grain boundaries and this becomes the starting point of fracture and remarkably lowers the Charpy absorption energy in some cases. Regarding the reheated weld metal as well, if suppressing the amount of C to 0.100% or less, Si to 0.50% or less, preferably 0.40% or less, Al to 0.100% or less, and Cr+Mo+V to 2.50% or less, coarsening of MA formed along prior austenite grain boundaries is suppressed. If taking a test piece at a location including the reheated weld metal, for example, centered at the meeting part of the earlier welding and later welding and providing notches at the center part of the circumferential direction of the weld metal, for example, the Charpy absorption energy at −40° C. and −60° C., becomes 50J or more.

Below, the reasons for limitation of the chemical compositions of the matrix material of the high strength steel pipe and the steel plate of the material of the steel pipe of the present invention will be explained.

C is a basic element improving the strength of the steel and has to be added in 0.020% or more. On the other hand, by excessive addition of C over 0.080%, the steel material falls in weldability and coarse MA is formed at the reheated HAZ causing a drop in toughness, so the upper limit of the amount of C was made 0.080% or less. From the viewpoint of the low temperature toughness and the strength, the preferable range of the amount of C is 0.030 to 0.060%.

Si is a deoxidizing element and has to be added in an amount of 0.01% or more. On the other hand, if the amount of Si exceeds 0.50%, coarse MA is formed at the reheated HAZ causing a drop in toughness, so the upper limit was made 0.50% or less.

Mo is an element improving the hardenability and forming carbonitrides to improve the strength. To obtain this effect, addition of 0.01% or more is necessary. On the other hand, if adding a large amount of Mo exceeding 0.15%, the strength rises and the toughness falls. Further, coarse MA is formed at the reheated HAZ and the toughness is impaired, so the upper limit is made 0.15% or less.

Al is a deoxidizing element and has to be added in an amount of 0.0005% or more. To sufficiently reduce the amount of oxygen, it is preferable to add Al in an amount of 0.001% or more. On the other hand, if adding Al in over 0.030%, coarse MA is formed at the reheated HAZ and the toughness falls, so the upper limit is made 0.030% or less.

Nb is an element forming carbides and nitrides and effective for improving the strength. To obtain this effect, addition of 0.0001% or more is necessary. To sufficiently improve the strength, addition of 0.001% or more of Nb is preferable. On the other hand, if adding Nb in over 0.030%, coarse MA is formed at the reheated HAZ and the toughness falls, so the upper limit is made 0.030% or less.

Furthermore, in the present invention, it is necessary that C+0.25Si+0.1Mo+Al+Nb be 0.100% or less. This is because if the C+0.25Si+0.1Mo+Al+Nb exceeds 0.100%, coarse MA is formed at the reheated HAZ and the toughness falls. The lower limit of C+0.25Si+0.1Mo+Al+Nb is 0.0241% since the lower limits of C, Si, Mo, Al, and Nb are respectively 0.020%, 0.01%, 0.01%, 0.0005%, and 0.0001%. Further, the preferable lower limits of Al and Nb are both 0.001%, so the preferable lower limit of C+0.25Si+0.1Mo+Al+Nb is 0.0255%.

Mn is an element required for adjusting the strength and toughness of the steel. If less than 1.50%, securing the strength becomes difficult, while if over 2.50%, the toughness of the HAZ falls. For this reason, the amount of addition of Mn is made 1.50 to 2.50%.

Ti is a deoxidizing element. Further, it is an element forming nitrides and exhibiting an effect on the refinement of the crystal grains. To obtain this effect, addition of 0.003% or more is necessary. On the other hand, addition of over 0.030% causes a remarkable drop in toughness due to the formation of carbides, so the upper limit is made 0.030%.

B is an element increasing the hardenability when in solid solution and lowering the solid solution N and thereby improving the toughness of the HAZ when precipitating as BN. To improve the balance of strength and toughness, the amount of addition has to be made 0.0001 to 0.0030%.

P is an impurity. If contained in an amount of over 0.020%, the matrix material of the steel pipe is remarkably impaired in toughness, so the upper limit is made 0.020% or less. To suppress the drop in toughness of the HAZ of steel pipe, the upper limit of the P content is preferably made 0.010% or less.

S is also an impurity. If contained in an amount over 0.0030%, coarse sulfides are produced and the toughness is impaired, so the upper limit was made 0.0030%.

Note that in the present invention, as elements for improving the strength and toughness, one or more elements of Cu, Ni, Cr, V, Zr, and Ta may be added.

Cu is an element effective for improving the strength without causing a drop in the toughness, but if the content is less than 0.05%, a sufficient effect is not obtained in some cases, while if over 1.50%, cracks easily occur at the time of heating the steel slab or the time of welding. Therefore, the content of Cu is preferably made 0.05 to 1.50%.

Ni is an element effective for improvement of the toughness and strength. To obtain this effect, it is preferable to add 0.05% or more. On the other hand, if adding Ni in over 5.00%, the weldability is impaired in some cases, so the upper limit is preferably made 5.00% or less.

Cr is an element contributing to the improvement of the strength of the steel by precipitation strengthening. Addition of 0.02% or more is preferable. On the other hand, if adding Cr in an amount over 1.50%, the hardenability is raised, a bainite structure is formed, and the toughness is impaired in some cases, so the upper limit is preferably made 1.50%.

W is an element improving the hardenability and improving the strength. To obtain these effects, addition of 0.01% or more is preferable. On the other hand, if adding a large amount of W over 2.0%, the strength rises and the toughness falls. Further, to suppress the formation of coarse MA at the reheated HAZ, the upper limit is preferably made 0.50% or less.

V, Zr, and Ta are elements forming carbides and nitrides and contributing to the improvement of the strength. The lower limits are preferably made 0.010% or more, 0.0001% or more, and 0.0001% or more. The preferable lower limits of the Zr and Ta for sufficiently obtaining the effect of improvement of the strength are both 0.001% or more. On the other hand, if V, Zr, and Ta are excessively added, the toughness is sometimes impaired, so the upper limits of the V, Zr, and Ta are preferably made respectively 0.100% or less, 0.0500% or less, and 0.0500% or less.

Furthermore, to control the forms of the oxides and inclusions, one or more of Mg, Ca, REM, Y, Hf, and Re may be added.

Mg is effective as a deoxidizing element. Addition of 0.0001% or more is preferred. Further, Mg acts as ingrain transformation and pinning particles and contributes to the refinement of the grains of the steel and HAZ, so to obtain this effect, addition of 0.0010% or more is preferable. On the other hand, if adding Mg over 0.0100%, coarse oxides are easily formed and the toughness of the base metal and HAZ is impaired in some cases, so the upper limit is preferably made 0.0100% or less.

Ca, REM, Y, Hf, and Re are elements forming sulfides and are effective in particular for suppressing the formation of MnS stretched in the rolling direction. To obtain the effect of improvement of the characteristics in the thickness direction of the steel material, in particular, the lamellar tear resistance, the lower limits of the amount of addition of Ca, REM, Y, Hf, and Re are preferably made 0.0005% or more. On the other hand, if the amounts of addition of Ca, REM, Y, Hf, and Re exceed 0.0050%, they form coarse inclusions and impair the toughness in some cases, so the upper limits are preferably made 0.0050% or less.

Steel containing the above chemical compositions is produced by the steelmaking process, then made into a slab by the continuous casting process and made into steel plate by hot rolling. In the present invention, the hot rolling is important. The steel slab is reheated, then rolled at the recrystallization temperature or higher for "recrystallization rolling", then is rolled at less than the recrystallization temperature and in the austenite range for "nonrecrystallization rolling". The hot rolling has to be performed under the following conditions so as to make the structure of the steel plate finer, preferably to make prior austenite average particle size 20 μm or less.

When hot rolling the steel slab, the temperature of the reheating is made 1000° C. or more. This is because if performing the hot rolling at a temperature where the structure of the steel becomes a single austenite phase, that is, in the austenite region, the crystal grain size of the steel plate is made finer. The upper limit is not defined, but to suppress coarsening of the prior austenite grains, the reheating temperature is preferably made 1250° C. or less.

The reduction ratio of the nonrecrystallization rolling is made 3 or more. Due to this, the prior austenite becomes finer in crystal grain size and the average particle size becomes 20 μm or less. Note that in the present invention, the reduction ratio of the nonrecrystallization rolling means the ratio of the thickness before the start of nonrecrystallization rolling divided by the thickness after nonrecrystallization rolling.

Further, the reduction ratio of the recrystallization rolling is preferably made 2 or more to refine the crystal grain size of the prior austenite. Note that in the present invention, the reduction ratio of the recrystallization rolling means the ratio of the thickness of the steel slab divided by the thickness after the recrystallization rolling. Further, no upper limit of the reduction ratio of the nonrecrystallization rolling and recrystallization rolling is defined, but if considering the thickness of the steel slab before rolling and the thickness of the steel slab after rolling, it is usually 10 or less.

Furthermore, after the end of the rolling, the steel plate is water cooled. If making the temperature of stopping the water cooling 500° C. or lower, a superior strength and toughness can be obtained. No lower limit of the temperature for stopping the water cooling is defined. The water cooling may be performed even down to room temperature, but if considering the productivity and hydrogen defects, 150° C. or more is preferable.

The metal structure of the thus obtained steel plate has an area ratio of bainite or an area ratio of bainite and martensite of 80% or more and a balance of a total of one or more of granular bainite, polygonal ferrite, and MA of 20% or less. The steel pipe produced using this steel plate as a material has a tensile strength in the circumferential direction of 900 MPa or more, a superior low temperature toughness as well, and a Charpy absorption energy measured at −40° C. of 200 J or more.

When shaping the steel plate into a tube, then arc welding the seam portions to obtain a steel pipe, the shaping is preferably by the UOE process of C-pressing, U-pressing, and O-pressing the steel plate. The UOE process is a production process suitable for shaping steel pipe for line pipe of a high strength and a thickness of 10 to 30 mm.

For the arc welding, submerged arc welding is preferably employed from the viewpoint of the toughness of the weld metal and productivity. If using steel plate made of the chemical compositions of the present invention as a material, even if performing submerged arc welding, with its large input heat of welding, from the inner surface and outer surface of the steel pipe, it is possible to make the width of the MA formed along the prior austenite grain boundaries of the reheated HAZ 10 μm or less and make the length 50 μm or less. Further, when performing submerged arc welding, the input heat is preferably made 10.0 kJ/mm or less. Due to this, the prior austenite average particle size of the HAZ becomes 500 μm or less and the MA formed along the prior austenite grain boundaries of the reheated HAZ can be further reduced in width and length.

The MA can be observed by taking a sample from the reheated HAZ, mechanically polishing and Nital etching it, and viewing it by an SEM. The MA should be observed by an SEM by a power of 1000× to 10000×. The smaller the width and length of the MA present along prior austenite grain boundaries, the more preferable. The lower limit is not defined, but if less than 0.1 μm, discrimination becomes difficult.

Further, the wire used for the welding is preferably made the following elements to make the chemical compositions of the weld metal the later explained ranges considering dilution of the elements by the base metal. That is, it may contain, by mass %, C: 0.01 to 0.12%, Si: 0.05 to 0.5%, Mn: 1.0 to 2.5%, and Ni: 2.0 to 8.5%, further contain one or more of Cr, Mo, and V in a range of Cr+Mo+V: 1.0 to 5.0%, and have a balance of Fe and unavoidable impurities. B: 0.0001 to 0.0050% may also be included.

Furthermore, the chemical compositions of the weld metal will be explained.

C is an element extremely effective for improving the strength. 0.010% or more is preferably included. However, if the amount of C is too great, weld cold cracking easily occurs. In particular, the HAZ sometimes hardens and the toughness is impaired at the so-called T-cross parts where the on-site weld zone and seam welding cross. For this reason, the upper limit of the amount of C is preferably made 0.100%. To improve the toughness of the weld metal, the upper limit is more preferably made 0.050% or less.

Si prevents the formation of the welding defects of blowholes, so is preferably included in an amount of 0.01% or more. On the other hand, if excessively included, the low temperature toughness is remarkably degraded, so the upper limit is preferably made 0.50% or less. In particular, when welding a plurality of times, the low temperature toughness of the reheated weld metal is sometimes degraded, so the upper limit is more preferably made 0.40% or less.

Mn is an element effective for securing a superior balance of strength and toughness. The lower limit is preferably made 1.00% or more. However, if Mn is included in a large amount, segregation is promoted and the low temperature toughness is degraded. Not only that, production of welding wire used for welding becomes difficult. Therefore, the upper limit is preferably made 2.00% or less.

Ni is an element raising the hardenability to secure strength and further improving the low temperature toughness. It is preferably included in an amount of 1.30% or more. On the other hand, if the content of Ni is too great, high temperature cracking sometimes occurs, so the upper limit was made 3.20% or less.

Al is an element added for improving the refining and solidification when producing welding wire. It is also added to the base metal, so 0.0005% or more is sometimes included.

Further, to actively utilize the fine Ti-based oxides and suppress coarsening of the grains of the weld metal, 0.001% or more of Al is preferably contained. However, Al is an element promoting the formation of MA, so the preferable upper limit of the content is 0.100% or less.

Ti is an element forming micro oxides and refining the grains of the weld metal and is preferably included in an amount of 0.003% or more. On the other hand, if Ti is included in a large amount, a large amount of carbides of Ti are produced and the low temperature toughness is degraded, so the upper limit is preferably made 0.050% or less.

O is an impurity. The amount of oxygen finally remaining in the weld metal is usually 0.0001% or more.

However, when the amount of O remains in over 0.0500%, the coarse oxides become more numerous and the toughness of the weld metal sometimes drops, so the upper limit is preferably made 0.0500% or less.

Cr, Mo, and V are all elements raising the hardenability. For high strength of the weld metal, among these, one or more of these are preferably included in a total of 1.00% or more. On the other hand, if the total of the one or more of Cr, Mo, and V exceeds 2.50%, the low temperature toughness sometimes deteriorates, so the upper limit is preferably made 2.50% or less.

P and S are impurities. To reduce the deterioration of the low temperature toughness of the weld metal and cold crack susceptibility, the respective upper limits are preferably made 0.020% and 0.0100% or less. Note that from the viewpoint of the low temperature toughness, the more preferably upper limit of P is 0.010%.

The weld metal may further contain B.

B is an element increasing the hardenability of the weld metal. To raise the strength, it is preferably contained in an amount of 0.0001% or more. On the other hand, if the content of the B exceeds 0.0050%, the toughness is sometimes impaired, so the upper limit is preferably made 0.0050% or less.

If making the chemical compositions of the weld metal the above range, it is possible to make the MA formed along the prior austenite grain boundaries of the reheated weld metal a width of 10 μm or less and a length of 50 μm or less. Furthermore, to refine the MA, it is preferable to perform submerged arc welding with an input heat of 10.0 kJ/mm or less.

When running tensile tests in the circumferential direction at the locations of the steel pipe including the weld metal as well, the tensile strength is preferably 900 MPa or more. For this reason, preferably the strength of the weld metal is made higher than that of the base metal, softening of the HAZ is suppressed, and location of breakage in the tensile test is made the base metal. To make the strength of the weld metal higher than that of the base metal and improve the toughness of the weld metal, it is preferable to make the metal structure of the weld metal one with an area ratio of bainite and an area ratio of bainite and martensite of 80% or more and with the balance of the total of one or more of granular bainite, polygonal ferrite, and MA of 20% or less.

When using an optical microscope to observe the structures of the steel plate and base metal and weld metal of the steel pipe, the cross-section in the circumferential direction of the steel pipe or width direction of the steel plate is made the observed cross-section, mechanically polished, then etched by Nital. The sample used for observation by the optical microscope is preferably prepared and the average particle size of the prior austenite measured by the sectioning method of JIS G 0551. The metal structure of bainite and martensite seen in the case of observing the metal structures of the steel plate and base metal and weld metal of the steel pipe of the present invention by an optical microscope is shown schematically in FIG. 4.

Figure 4:
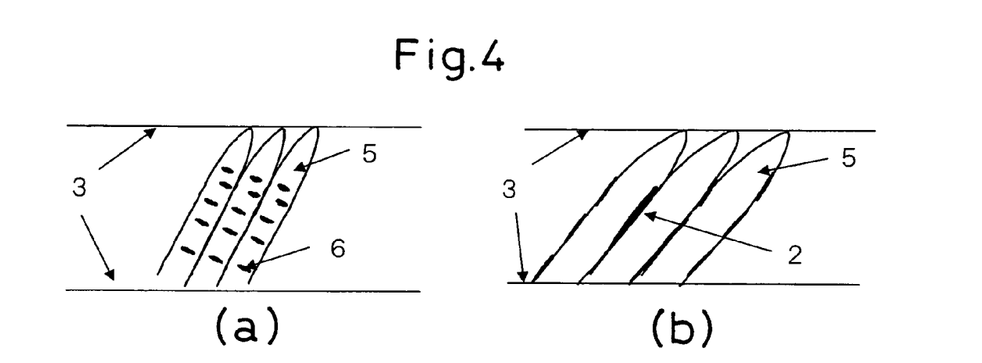
FIG. 4 is a schematic view of martensite or bainite.

FIG. 4(a) shows a metal structure also called "lower bainite" which is comprised of fine laths 5 and fine cementite 6 precipitated in the laths. Note that in observation of the structure by an optical microscope, martensite, in the same way as FIG. 4(a), is also comprised of fine laths 5 and fine cementite 6 precipitated in the laths. FIG. 4(b) shows a metal structure also called "pseudo upper bainite". It has laths of greater widths than the lower bainite of the FIG. 4(a). Further, it does not have fine cementite in the laths, but has MA between the laths 5. In the present invention, "bainite" is the general term for lower bainite of the form schematically shown in FIG. 4(a) and the pseudo upper bainite of the form schematically shown in FIG. 4(b).

Figure 5:
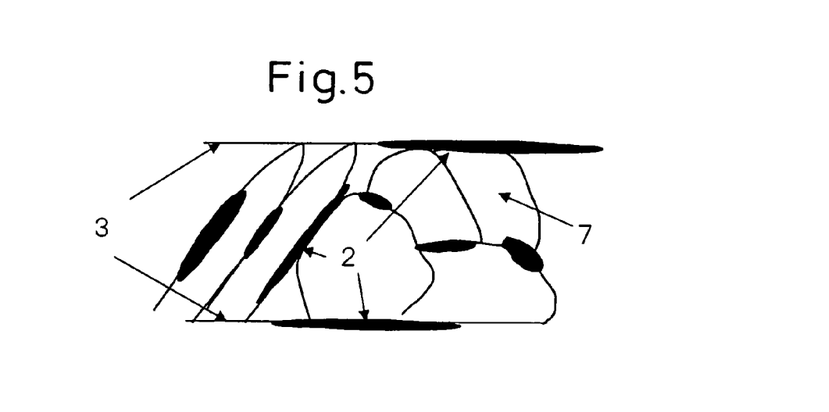
FIG. 5 is a schematic view of granular bainite.

Note that when using an optical microscope to observe a metal structure, both martensite and lower bainite have the forms schematically shown in FIG. 4(a), so discrimination is difficult. Note that martensite and bainite and ferrite and granular bainite can be discriminated by an optical microscope. Granular bainite resembles acicular ferrite. As schematically shown in FIG. 5, it has coarser MA than pseudo upper bainite and, unlike bainite, has granular ferrite 7 present.

Further, to make the tensile strength in the circumferential direction of the steel pipe 900 MPa or more and secure a good toughness, it is preferable to make one or both of carbon equivalent Ceq calculated from the chemical compositions of the base metal and weld metal and the hardenability indicator Pcm suitable ranges. The carbon equivalent Ceq is calculated by the following (formula 1). In the base metal, it is in the range of 0.20 to 0.80, while in the weld metal, it is preferably 0.60 to 1.30. If considering the balance of the strength and toughness, in the base metal, it is more preferably 0.30 to 0.70 in range and, in the weld metal, 0.70 to 1.20:

$$Ceq = C + Mn/6 + (Cu+Ni)/15 + (Cr+Mo+V)/5 \quad \text{(formula 1)}$$

where, C, Mn, Cu, Ni, Cr, Mo, and V are contents (mass %) of the elements.

Further, the hardenability indicator Pcm is calculated by the following (formula 2). In the base metal, it is preferably 0.100 to 0.300 in range, while in the weld metal, it is 0.200 to 0.500. If considering the balance of the strength and toughness, in the base metal, it is more preferably 0.150 to 0.250 in range and, in the weld metal, 0.250 to 0.400:

$$Pcm = C + Si/30 + (Mn+Cu+Cr)/20 + Ni/60 + Mo/15 + V/10 + 5 \times 13 \quad \text{(formula 2)}$$

where, C, Si, Mn, Cu, Cr, Ni, Mo, V, and B are contents (mass %) of the elements.

Note that when the contents of the optionally contained elements Cu, Ni, Cr, and V are less than the preferable lower limits, in (formula 1) and (formula 2), the carbon equivalent Ceq and hardenability indicator Pcm are calculated assuming these to be 0.

The weld zone and HAZ of the steel pipe are preferably further heat treated. If heating to a temperature of 200 to 500° C., the coarse MA formed along the prior austenite grain boundaries breaks up into bainite and fine cementite and the toughness is improved. With a heating temperature of less than 200° C., the breakup of the coarse MA is insufficient and the effect of improvement of the toughness is not sufficient sometimes, so the lower limit is preferably made 200° C. or more. On the other hand, if heating the weld zone to over 500° C., precipitate is formed and the toughness of the weld metal deteriorates in some cases, so the upper limit is preferably made 500° C. or less. If the MA formed at the reheated HAZ breaks up into bainite and cementite, while the shapes are similar to MA in observation by SEM, the insides contain fine white precipitate making differentiation from MA possible.

The heat treatment of the weld zone and HAZ may be performed by heating from the outer surface by a burner or by high frequency heating. After the outermost surface reaches the heat treatment temperature, the pipe may be immediately cooled, but to promote the breakup of MA, the pipe is preferably held there for 1 sec to 300 sec. However, if considering the cost of the facilities and the productivity, the holding time is preferably 180 sec or less.

EXAMPLES

Below, the present invention will be explained in detail using examples.

Example 1

Steels made of the chemical compositions of Table 1 and Table 2 (continuation of Table 1) were produced and continuously cast to obtain steel slabs having thicknesses of 240 mm. The blank spaces in Table 1 mean the content of the ingredient is less than the detectable limit. These steel slabs were heated to 1100 to 1210° C., hot rolled at 950° C. or higher recrystallization temperatures to a thickness of 100 mm, then started to be rolled at 880° C. by nonrecrystallization rolling. The rolling was ended at 750° C. to obtain thicknesses of 13 to 25 mm. Water cooling was started in the temperature range of 670 to 750° C. The water cooling was stopped at 300° C.

The obtained steel plates were shaped into tubes by the UOE process, then the seam portions were welded from the inner surface and outer surface by one layer each by submerged arc welding. The chemical compositions of the welding wires were ones containing, by mass %, C: 0.01 to 0.12%, Si: 0.05 to 0.5%, Mn: 1.0 to 2.5%, and Ni: 2.0 to 8.5%, further containing one or more of Cr, Mo, and V to the range of Cr+Mo+V: 1.0 to 5.0%, and having a balance of Fe and unavoidable impurities. Part of the welding wires further contain B: 0.0001 to 0.0050%. The input heat of the welding was made 2.0 to 5.0 kJ/mm.

Using the position 1 mm from the boundary between the weld metal and the HAZ, that is, the weld line, as the observation position, the metal structure of the HAZ was observed based on JIS G 0551 and the average particle size of the old austenite was measured by the sectioning method. Further, a Nital etched sample was observed by an SEM and measured for width and length of the MA. The tensile strength in the circumferential direction of the base metal was measured and a Charpy impact test of the HAZ conducted based on the API Standard 5L. The Charpy impact test of the HAZ was conducted so that the position of the notch became the reheated HAZ. Specifically, a V-notch was introduced to a location of 1 mm from the bonded part and the test conducted at −40° C. and −60° C. The results are shown in Table 3. Note that the tensile strength of the circumferential direction measured using the weld metal at the center part of the test piece is equivalent to the tensile strength of the matrix material. It was confirmed that the location of breakage was the base metal.

Further, samples were taken from the weld metal of some of the steel pipes and analyzed for chemical compositions. The results are shown in Table 4. The blank spaces in Table 4 show that the content of the ingredient is less than the detectable limit. Furthermore, using the position of 1 mm from the meeting part of the earlier welding and later welding at the center part in the circumferential direction of the weld metal of these steel pipes as the observed position, the structure of the weld metal formed by the earlier welding, that is, the metal structure of the reheated weld metal, was observed based on JIS G 0551 and the prior austenite average particle size was measured by the sectioning method. Furthermore, a Nital etched sample was observed by an SEM and the width and length of the MA measured. The tensile test and Charpy impact test of the weld metal were conducted based on API Standard 5L. The Charpy impact test of the weld metal was performed so that the position of the notch became the reheated weld metal. Specifically, test pieces were tested at −40° C. and −60° C. while introducing a V-notch at the center at the meeting part of the earlier welding and later welding of the weld metal. The results are shown in Table 5.

Furthermore, for some of the samples, samples containing weld metal and HAZ were taken, measured for the temperature of the surface by a thermocouple, and heat treated by a burner from the outer surface of the weld zone and HAZ. Note that samples were not held at the heat treatment temperature. They were immediately cooled after reaching the heat treatment temperature. The samples were heat treated under the conditions shown in Table 6, then measured for width and length of the MA at the reheated HAZ and subjected to Charpy impact tests of the HAZ. Further, the tensile strength in the circumferential direction was measured using the weld metal as the center part of the test piece. The results are shown in Table 5. The weld metal was heat treated under the conditions shown in Table 7, then measured for width and length of the MA at the reheated weld metal and subjected to a Charpy impact test and tensile test. The results are shown in Table 7.

In Table 3, the Steel Pipe Matrix Material Nos. B1 to B22 show examples of the present invention. These steel plates all have high tensile strengths, fine MA observed at the prior austenite grain boundaries of the reheated HAZ, superior low temperature toughness of the HAZ, and Charpy absorption energy of the HAZ at −40° C. and −60° C., shown by $vE_{-40}$ and $vE_{-60}$, of over 50J.

On the other hand, the Steel Pipe Matrix Material Nos. B23 to B31 are comparative examples having chemical compositions outside the range of the present invention. All have C+0.25Si+0.1Mo+Al+Nb over 0.100%, so the MA of the reheated HAZ coarsens and the toughness of the HAZ falls. Further, the Steel Pipe Matrix Material No. B23 has an amount of C lower than the range of the present invention, so the tensile strength falls. The Steel Pipe Matrix Material Nos. B26 and B27 have contents of P and S over the ranges of the present invention, so the toughness of the HAZ remarkably falls.

The Weld Metal Nos. W1 to W14 shown in Table 5 are invention examples with ingredients of the weld metal in the preferable ranges. For this reason, the MA of the reheated weld metal is fine and the Charpy absorption energy of the weld metal at −40° C. and −60° C. shown by $vE_{-40}$ and $vE_{-60}$ is over 50J. On the other hand, the Weld Metal Nos. W15 to W20 are comparative examples with chemical compositions of the base metal outside the ranges of the present invention and with chemical compositions of the weld metal outside the preferable ranges. Further, the Weld Metal Nos. W21 to W25 are reference examples with chemical compositions of the weld metal outside the preferable ranges.

The Weld Metal No. W15 has an amount of C smaller than the preferable range, so the tensile strength falls. The Weld Metal Nos. W16 and W17 respectively have an amount of C and an amount of Mn over the preferable ranges, so the strength rises, the MA of the reheated weld metal coarsens, and the toughness of the weld metal falls. The Weld Metal No. W18 has an amount of P and No. W19 an amount of S in excess of the preferable ranges, so are examples of a drop in toughness of the weld metal. The Weld Metal No. W20 has an amount of Ti in excess of the preferable range, so Ti carbides are formed and the toughness of the weld metal falls.

The Weld Metal No. W21 has an amount of Si and No. W22 an amount of Al over the preferable ranges, so the MA of the reheated weld metal coarsens and the toughness of the weld metal falls. The Weld Metal No. W23 has an amount of Ni greater than the preferable range. While good in strength and toughness, high temperature cracks occur. The Weld Metal No. W24 has an amount of Cr+Mo+V smaller than the preferable range, so the tensile strength falls, while the Weld Metal No. W25 has an amount of Cr+Mo+V over the preferable range, so the strength rises, the MA of the reheated weld metal coarsens, and the toughness of the weld metal falls.

In Table 6, the Steel Pipe Matrix Material Nos. B1 to B19 have heat treatment temperatures in the preferable range. Compared with before heat treatment, the tensile strength in the circumferential direction falls, the MA of the reheated HAZ breaks up and becomes finer, and the toughness is improved. On the other hand, the Steel Pipe Matrix Material No. B20 has a heat treatment temperature lower than the preferable range, so the effects of refinement of the MA and improvement of the toughness are not remarkable. Further, the Steel Pipe Matrix Material Nos. B21 and B22 have heat treatment temperatures higher than the preferable range. While some breakup of MA is recognized, the toughness falls compared with before heat treatment.

The Weld Metal Nos. W1 to W11 shown in Table 7 have heat treatment temperatures within the preferable range. Compared with before heat treatment, the tensile strength falls, the MA of the reheated weld metal breaks up and becomes finer, and the toughness rises. On the other hand, the Weld Metal No. W12 has a heat treatment temperature lower than the preferable range, so the effects of refinement of the MA and improvement of the toughness are not remarkable. Further, the Weld Metal Nos. W13 and W14 have heat treatment temperatures higher than the preferable temperature. While some breakup of MA is observed, the toughness does not fall compared with before heat treatment.

TABLE 1

| Steel Plate No. | Chemical Compositions (mass %) | | | | | | | | | | | |
|---|---|---|---|---|---|---|---|---|---|---|---|---|
| | C | Si | Mn | P | S | Mo | Nb | Al | Ti | B | Cu | Ni |
| A | 0.035 | 0.10 | 1.95 | 0.005 | 0.0005 | 0.09 | 0.025 | 0.004 | 0.012 | 0.0010 | | 0.50 |
| B | 0.040 | 0.10 | 1.81 | 0.008 | 0.0006 | 0.04 | 0.016 | 0.013 | 0.003 | 0.0005 | | 0.40 |
| C | 0.040 | 0.08 | 1.90 | 0.003 | 0.0008 | 0.07 | 0.017 | 0.008 | 0.012 | 0.0030 | 0.30 | 0.30 |
| D | 0.046 | 0.07 | 2.12 | 0.004 | 0.0003 | 0.06 | 0.016 | 0.010 | 0.016 | 0.0003 | 0.30 | 0.80 |
| E | 0.044 | 0.11 | 1.85 | 0.009 | 0.0006 | 0.01 | 0.014 | 0.007 | 0.012 | 0.0020 | | 0.30 |
| F | 0.045 | 0.10 | 1.85 | 0.026 | 0.0004 | 0.01 | 0.013 | 0.015 | 0.012 | 0.0004 | 0.35 | 0.35 |
| G | 0.036 | 0.02 | 1.80 | 0.003 | 0.0006 | 0.15 | 0.030 | 0.005 | 0.013 | 0.0015 | | |

TABLE 1-continued

| Steel Plate No. | C | Si | Mn | P | S | Mo | Nb | Al | Ti | B | Cu | Ni |
|---|---|---|---|---|---|---|---|---|---|---|---|---|
| H | 0.035 | 0.01 | 1.90 | 0.007 | 0.0005 | 0.08 | 0.030 | 0.013 | 0.008 | 0.0003 | 0.30 | 0.50 |
| I | 0.036 | 0.10 | 1.90 | 0.005 | 0.0002 | 0.07 | 0.015 | 0.013 | 0.010 | 0.0008 |  | 0.20 |
| J | 0.045 | 0.11 | 2.20 | 0.008 | 0.0004 | 0.11 | 0.012 | 0.004 | 0.030 | 0.0008 | 0.30 | 0.30 |
| K | 0.046 | 0.11 | 1.85 | 0.002 | 0.0003 | 0.01 | 0.020 | 0.004 | 0.024 | 0.0026 |  |  |
| L | 0.048 | 0.11 | 2.12 | 0.004 | 0.0006 | 0.02 | 0.014 | 0.010 | 0.012 | 0.0006 |  | 0.40 |
| M | 0.035 | 0.11 | 1.86 | 0.006 | 0.0008 | 0.05 | 0.015 | 0.015 | 0.024 | 0.0025 |  |  |
| N | 0.046 | 0.12 | 2.12 | 0.006 | 0.0006 | 0.05 | 0.015 | 0.001 | 0.013 | 0.0005 | 0.30 | 0.35 |
| O | 0.040 | 0.08 | 2.00 | 0.004 | 0.0004 | 0.07 | 0.015 | 0.017 | 0.012 | 0.0010 | 0.30 | 0.50 |
| P | 0.035 | 0.18 | 2.00 | 0.003 | 0.0006 | 0.01 | 0.013 | 0.006 | 0.008 | 0.0003 | 0.40 | 0.80 |
| Q | 0.040 | 0.08 | 1.96 | 0.002 | 0.0006 | 0.06 | 0.018 | 0.003 | 0.010 | 0.0019 |  |  |
| R | 0.040 | 0.13 | 2.20 | 0.004 | 0.0006 | 0.08 | 0.016 | 0.003 | 0.005 | 0.0003 | 0.30 | 0.50 |
| S | 0.052 | 0.06 | 2.30 | 0.007 | 0.0003 | 0.01 | 0.013 | 0.016 | 0.026 | 0.0030 |  | 0.40 |
| T | 0.038 | 0.07 | 2.20 | 0.003 | 0.0005 | 0.10 | 0.014 | 0.020 | 0.012 | 0.0003 | 1.00 | 0.80 |
| U | 0.036 | 0.12 | 1.80 | 0.002 | 0.0008 | 0.08 | 0.016 | 0.003 | 0.017 | 0.0026 | 0.05 |  |
| V | 0.038 | 0.10 | 1.96 | 0.004 | 0.0025 | 0.01 | 0.015 | 0.020 | 0.018 | 0.0002 |  | 1.00 |
| W | 0.005 | 0.18 | 2.20 | 0.005 | 0.0026 | 0.40 | 0.030 | 0.005 | 0.012 | 0.0026 | 0.50 | 0.80 |
| X | 0.210 | 0.45 | 1.75 | 0.007 | 0.0015 | 0.01 | 0.030 | 0.016 | 0.013 | 0.0003 |  |  |
| Y | 0.040 | 0.12 | 3.50 | 0.015 | 0.0021 | 0.02 | 0.030 | 0.017 | 0.008 | 0.0029 |  |  |
| Z | 0.060 | 0.25 | 1.93 | 0.040 | 0.0026 | 0.60 | 0.030 | 0.009 | 0.019 | 0.0002 |  |  |
| AA | 0.045 | 0.17 | 1.86 | 0.003 | 0.0351 | 0.30 | 0.021 | 0.005 | 0.017 | 0.0027 | 0.30 | 0.30 |
| AB | 0.060 | 0.05 | 1.96 | 0.005 | 0.0030 | 0.30 | 0.030 | 0.100 | 0.023 | 0.0060 |  |  |
| AC | 0.059 | 0.09 | 2.40 | 0.003 | 0.0009 | 0.30 | 0.030 | 0.003 | 0.064 | 0.0002 |  | 0.60 |
| AD | 0.046 | 0.12 | 1.85 | 0.019 | 0.0008 | 0.02 | 0.030 | 0.014 | 0.002 | 0.0021 | 0.40 | 0.13 |
| AE | 0.060 | 1.50 | 1.96 | 0.002 | 0.0015 | 0.30 | 0.030 | 0.003 | 0.010 | 0.0003 | 0.50 | 1.50 |

TABLE 2

(Continuation of Table 1)

| Steel Plate No. | Cr, W, V, Zr, Ta | Mg, Ca, REM, Y, Hf, Re | C + 0.25Si + Al + 0.1Mo + Nb | Ceq | Pcm | Remarks |
|---|---|---|---|---|---|---|
| A | Cr: 0.30, V: 0.060 | Mg: 0.0053 | 0.098 | 0.483 | 0.176 | Inv. ex. |
| B | V: 0.060 | Ca: 0.0012 | 0.098 | 0.388 | 0.152 |  |
| C | V: 0.040 | REM: 0.0008 | 0.092 | 0.419 | 0.181 |  |
| D | V: 0.050, Zr: 0.0051 |  | 0.096 | 0.495 | 0.193 |  |
| E | Cr: 0.30, V: 0.060, Ta: 0.0032 |  | 0.094 | 0.446 | 0.177 |  |
| F | Cr: 0.60, Zr: 0.0012 | Ca: 0.0021 | 0.099 | 0.522 | 0.197 |  |
| G | W: 0.50, V: 0.060 | Mg: 0.0038 | 0.091 | 0.378 | 0.150 |  |
| H | Cr: 0.30, V: 0.100 | Ca: 0.0022 | 0.089 | 0.501 | 0.186 |  |
| I | V: 0.050 |  | 0.096 | 0.390 | 0.151 |  |
| J | Cr: 0.60, V: 0.070 | Mg: 0.0018 Ca: 0.0024 | 0.100 | 0.608 | 0.227 |  |
| K |  |  | 0.099 | 0.356 | 0.156 |  |
| L | Cr: 0.50, V: 0.060, Zr: 0.0137 |  | 0.102 | 0.544 | 0.200 |  |
| M | Cr: 0.40, V: 0.090 |  | 0.098 | 0.453 | 0.177 |  |
| N | Cr: 0.60 | Mg: 0.0033 Ca: 0.0035 | 0.097 | 0.573 | 0.213 |  |
| O |  | Y: 0.0010 | 0.099 | 0.441 | 0.176 |  |
| P | Cr: 0.70 | REM: 0.0007 | 0.100 | 0.590 | 0.212 |  |
| Q | Cr: 0.30, Zr: 0.0008 | Re: 0.0025 | 0.087 | 0.439 | 0.169 |  |
| R | Ta: 0.0229 |  | 0.099 | 0.476 | 0.185 |  |
| S | Cr: 0.30 | REM: 0.0006 | 0.097 | 0.524 | 0.206 |  |
| T | Cr: 0.60, V: 0.050 | Mg: 0.0025 Ca: 0.0017 | 0.100 | 0.675 | 0.257 |  |
| U | V: 0.050 | Hf: 0.0020 | 0.093 | 0.365 | 0.156 |  |
| V | Cr: 1.00 | Ca: 0.0021 | 0.099 | 0.633 | 0.208 |  |
| W | Cr: 0.50, V: 0.050 |  | 0.125 | 0.648 | 0.229 | Comp. ex. |
| X | V: 0.200 | Ca: 0.0013 | 0.370 | 0.544 | 0.335 |  |
| Y |  | REM: 0.0012 | 0.119 | 0.627 | 0.235 |  |
| Z | Cr: 0.60, V: 0.060 |  | 0.221 | 0.634 | 0.242 |  |
| AA | Cr: 0.30 | Mg: 0.0005 | 0.144 | 0.515 | 0.212 |  |
| AB | Cr: 0.30, V: 0.080 |  | 0.233 | 0.523 | 0.233 |  |
| AC | Cr: 0.30 | Ca: 0.0017 | 0.145 | 0.619 | 0.228 |  |

TABLE 2-continued (Continuation of Table 1)

| Steel Plate No. | Chemical Compositions (mass %) | | | | |
|---|---|---|---|---|---|
| | Cr, W, V, Zr, Ta | Mg, Ca, REM, Y, Hf, Re | C + 0.25Si + Al + 0.1Mo + Nb | Ceq | Pcm | Remarks |
| AD | | | 0.122 | 0.394 | 0.177 | |
| AE | Cr: 0.30 | REM: 0.0007 | 0.498 | 0.640 | 0.295 | |

TABLE 3

| Steel Pipe base metal No. | Steel Plate No. | Thickness mm | MA of reheated HAZ | | Base metal Tensile strength MPa | Toughness of HAZ | | Remarks |
|---|---|---|---|---|---|---|---|---|
| | | | Width μm | Length μm | | vE₋₄₀ J | vE₋₆₀ J | |
| B1 | A | 14 | 4 | 30 | 915 | 100 | 80 | Inv. ex. |
| B2 | B | 25 | 3 | 20 | 923 | 90 | 70 | |
| B3 | C | 16 | 2 | 15 | 945 | 94 | 74 | |
| B4 | D | 15 | 4 | 24 | 932 | 125 | 65 | |
| B5 | E | 19 | 6 | 26 | 915 | 110 | 74 | |
| B6 | F | 17 | 5 | 32 | 910 | 95 | 75 | |
| B7 | G | 15 | 4 | 24 | 950 | 105 | 75 | |
| B8 | H | 16 | 5 | 15 | 920 | 91 | 71 | |
| B9 | I | 21 | 4 | 16 | 940 | 112 | 82 | |
| B10 | J | 23 | 2 | 18 | 925 | 110 | 70 | |
| B11 | K | 15 | 9 | 24 | 956 | 87 | 67 | |
| B12 | L | 16 | 7 | 22 | 1000 | 110 | 70 | |
| B13 | M | 17 | 5 | 26 | 950 | 117 | 77 | |
| B14 | N | 19 | 6 | 24 | 945 | 101 | 71 | |
| B15 | O | 24 | 4 | 31 | 923 | 94 | 74 | |
| B16 | P | 16 | 2 | 34 | 924 | 90 | 70 | |
| B17 | Q | 19 | 8 | 24 | 940 | 120 | 60 | |
| B18 | R | 20 | 4 | 25 | 915 | 87 | 67 | |
| B19 | S | 16 | 3 | 27 | 926 | 89 | 69 | |
| B20 | T | 21 | 1 | 29 | 930 | 91 | 71 | |
| B21 | U | 13 | 2 | 32 | 915 | 110 | 70 | |
| B22 | V | 17 | 4 | 14 | 915 | 130 | 74 | |
| B23 | W | 15 | 11 | 30 | 750 | 25 | 15 | Comp. ex. |
| B24 | X | 16 | 15 | 70 | 1150 | 13 | 5 | |
| B25 | Y | 21 | 12 | 80 | 1020 | 46 | 26 | |
| B26 | Z | 23 | 11 | 30 | 915 | 5 | 5 | |
| B27 | AA | 15 | 16 | 20 | 925 | 5 | 5 | |
| B28 | AB | 17 | 11 | 55 | 915 | 20 | 0 | |
| B29 | AC | 19 | 14 | 45 | 930 | 48 | 28 | |
| B30 | AD | 23 | 13 | 40 | 915 | 26 | 10 | |
| B31 | AE | 16 | 17 | 60 | 900 | 25 | 5 | |

TABLE 4

| Weld Metal No. | Steel plate code | Chemical Compositions (mass %) | | | | | | | | | | | | | Ceq | Pcm | Remark |
|---|---|---|---|---|---|---|---|---|---|---|---|---|---|---|---|---|---|
| | | C | Si | Mn | P | S | Ti | Al | Ni | Cr | Mo | V | B | O | Cr + Mo + V | | | |
| W1 | A | 0.055 | 0.25 | 1.63 | 0.005 | 0.0005 | 0.020 | 0.010 | 3.00 | 1.00 | 1.36 | 0.035 | 0.0003 | 0.0245 | 2.40 | 1.006 | 0.341 | Inv. ex. |
| W2 | B | 0.044 | 0.20 | 1.43 | 0.008 | 0.0006 | 0.018 | 0.008 | 2.90 | 1.00 | 1.50 | 0.060 | 0.0005 | 0.0285 | 2.41 | 0.988 | 0.329 | |
| W3 | C | 0.100 | 0.08 | 1.40 | 0.003 | 0.0008 | 0.025 | 0.005 | 2.50 | 1.00 | 1.20 | 0.040 | 0.0003 | 0.0213 | 2.24 | 0.948 | 0.350 | |
| W4 | D | 0.070 | 0.05 | 1.50 | 0.004 | 0.0003 | 0.026 | 0.004 | 2.40 | 0.88 | 1.23 | 0.050 | 0.0006 | 0.0265 | 2.16 | 0.912 | 0.321 | |
| W5 | E | 0.060 | 0.35 | 1.52 | 0.009 | 0.0006 | 0.021 | 0.056 | 3.00 | 0.90 | 1.32 | 0.060 | 0.0010 | 0.0323 | 2.28 | 0.969 | 0.342 | |
| W6 | F | 0.070 | 0.10 | 1.25 | 0.005 | 0.0004 | 0.026 | 0.003 | 2.45 | 1.11 | 1.11 | 0.040 | 0.0006 | 0.0245 | 2.26 | 0.894 | 0.313 | |
| W7 | G | 0.045 | 0.02 | 1.80 | 0.003 | 0.0006 | 0.021 | 0.015 | 2.65 | 1.00 | 0.95 | 0.060 | 0.0015 | 0.0198 | 2.01 | 0.924 | 0.307 | |
| W8 | H | 0.080 | 0.15 | 1.80 | 0.007 | 0.0005 | 0.026 | 0.001 | 1.40 | 0.95 | 1.50 | 0.030 | 0.0006 | 0.0178 | 2.48 | 0.969 | 0.352 | |
| W9 | I | 0.070 | 0.17 | 1.65 | 0.005 | 0.0002 | 0.030 | 0.003 | 3.00 | 0.85 | 1.45 | 0.050 | 0.0008 | 0.0426 | 2.35 | 1.015 | 0.356 | |
| W10 | J | 0.060 | 0.30 | 1.95 | 0.008 | 0.0004 | 0.035 | 0.012 | 3.00 | 0.60 | 0.40 | 0.070 | | 0.0351 | 2.35 | 0.799 | 0.281 | |
| W11 | K | 0.040 | 0.22 | 1.40 | 0.002 | 0.0003 | 0.024 | 0.001 | 2.80 | 1.30 | 1.50 | 0.060 | 0.0026 | 0.0215 | 2.41 | 1.032 | 0.348 | |
| W12 | L | 0.050 | 0.25 | 1.56 | 0.004 | 0.0006 | 0.004 | 0.005 | 2.50 | 1.30 | 1.23 | 0.060 | | 0.0198 | 2.32 | 0.995 | 0.331 | |
| W13 | M | 0.060 | 0.31 | 1.43 | 0.006 | 0.0008 | 0.045 | 0.012 | 2.50 | 1.50 | 1.24 | 0.050 | 0.0025 | 0.0234 | 2.41 | 1.023 | 0.359 | |
| W14 | N | 0.060 | 0.20 | 1.56 | 0.006 | 0.0006 | 0.025 | 0.007 | 2.13 | 1.23 | 1.12 | 0.000 | 0.0045 | 0.0195 | 2.35 | 0.932 | 0.339 | |

TABLE 4-continued

| Weld Metal No. | Steel plate code | Chemical Compositions (mass %) | | | | | | | | | | | | | Cr + Mo + V | Ceq | Pcm | Remark |
|---|---|---|---|---|---|---|---|---|---|---|---|---|---|---|---|---|---|---|
| | | C | Si | Mn | P | S | Ti | Al | Ni | Cr | Mo | V | B | O | | | | |
| W15 | W | 0.005 | 0.28 | 1.42 | 0.004 | 0.0004 | 0.026 | 0.013 | 2.56 | 1.02 | 1.12 | 0.000 | 0.0010 | 0.0234 | 2.14 | 0.840 | 0.259 | Co. ex. |
| W16 | X | 0.200 | 0.32 | 1.45 | 0.003 | 0.0006 | 0.023 | 0.002 | 2.45 | 1.13 | 1.12 | 0.000 | | 0.0195 | 2.25 | 1.055 | 0.455 | |
| W17 | Y | 0.050 | 0.24 | 2.50 | 0.004 | 0.0006 | 0.020 | 0.006 | 2.56 | 1.03 | 1.05 | 0.050 | 0.0003 | 0.0189 | 2.13 | 1.063 | 0.354 | |
| W18 | Z | 0.080 | 0.31 | 1.60 | 0.025 | 0.0008 | 0.020 | 0.026 | 2.56 | 1.12 | 1.02 | 0.050 | 0.0026 | 0.0256 | 2.19 | 0.955 | 0.355 | |
| W19 | AA | 0.080 | 0.31 | 1.63 | 0.004 | 0.0200 | 0.025 | 0.021 | 2.85 | 1.13 | 1.12 | 0.040 | 0.0006 | 0.0234 | 2.29 | 1.000 | 0.358 | |
| W20 | AC | 0.060 | 0.15 | 1.56 | 0.002 | 0.0006 | 0.100 | 0.032 | 2.85 | 1.03 | 1.03 | 0.040 | 0.0002 | 0.0256 | 2.10 | 0.930 | 0.316 | |
| W21 | O | 0.100 | 0.80 | 1.45 | 0.003 | 0.0005 | 0.035 | 0.024 | 3.00 | 0.96 | 0.96 | 0.050 | | 0.0243 | 1.97 | 0.936 | 0.366 | Ref. ex. |
| W22 | P | 0.070 | 0.18 | 1.70 | 0.005 | 0.0021 | 0.016 | 0.150 | 0.50 | 1.05 | 0.96 | 0.050 | 0.0026 | 0.0267 | 2.06 | 0.799 | 0.304 | |
| W23 | Q | 0.060 | 0.15 | 1.75 | 0.007 | 0.0002 | 0.018 | 0.021 | 4.00 | 0.89 | 0.86 | 0.030 | 0.0005 | 0.0321 | 1.78 | 0.974 | 0.327 | |
| W24 | R | 0.040 | 0.12 | 1.65 | 0.005 | 0.0003 | 0.020 | 0.003 | 2.56 | | | | 0.0029 | 0.0248 | | 0.486 | 0.184 | |
| W25 | S | 0.060 | 0.25 | 1.63 | 0.005 | 0.0006 | 0.036 | 0.033 | 2.85 | 3.50 | 0.60 | 0.060 | | 0.0216 | 4.16 | 1.354 | 0.418 | |

TABLE 5

| Weld Metal No. | Steel plate Code | MA of reheated weld metal | | Mechanical properties of weld metal | | | Remark |
|---|---|---|---|---|---|---|---|
| | | Width μm | Length μm | Tensile strength MPa | vE$_{-40}$ J | vE$_{-60}$ J | |
| W1 | A | 2 | 20 | 1056 | 120 | 95 | Inv. ex. |
| W2 | B | 3 | 10 | 1037 | 130 | 105 | |
| W3 | C | 4 | 15 | 995 | 125 | 100 | |
| W4 | D | 2 | 10 | 958 | 135 | 110 | |
| W5 | E | 4 | 30 | 1018 | 145 | 120 | |
| W6 | F | 6 | 20 | 1012 | 124 | 99 | |
| W7 | G | 2 | 14 | 1031 | 135 | 110 | |
| W8 | H | 5 | 15 | 1018 | 105 | 80 | |
| W9 | I | 4 | 12 | 1066 | 124 | 99 | |
| W10 | J | 3 | 15 | 939 | 125 | 100 | |
| W11 | K | 2 | 13 | 1084 | 150 | 125 | |
| W12 | L | 5 | 24 | 1044 | 110 | 85 | |
| W13 | M | 4 | 25 | 1074 | 151 | 126 | |
| W14 | N | 6 | 14 | 979 | 115 | 90 | |
| W15 | W | 2 | 25 | 882 | 130 | 105 | Co. ex. |
| W16 | X | 11 | 55 | 1108 | 30 | 5 | |
| W17 | Y | 12 | 53 | 1117 | 30 | 5 | |
| W18 | Z | 6 | 15 | 1003 | 24 | 10 | |
| W19 | AA | 4 | 12 | 1050 | 45 | 20 | |
| W20 | AC | 9 | 46 | 977 | 45 | 20 | |
| W21 | O | 13 | 55 | 982 | 35 | 10 | Ref. ex. |
| W22 | P | 15 | 65 | 902 | 25 | 0 | |
| W23 | Q | 4 | 15 | 1023 | 110 | 90 | |
| W24 | R | 4 | 15 | 870 | 42 | 17 | |
| W25 | S | 11 | 51 | 1221 | 10 | 5 | |

TABLE 6

| Steel Pipe base metal No. | Steel Plate No. | Heat treatment temperature °C | MA of reheated HAZ | | Circumferential direction Tensile strength MPa | Toughness of HAZ | | Remark |
|---|---|---|---|---|---|---|---|---|
| | | | Width μm | Length μm | | vE$_{-40}$ J | vE$_{-60}$ J | |
| B1 | A | 350 | 3 | 25 | 905 | 130 | 90 | Inv. ex. |
| B2 | B | 400 | 2 | 15 | 913 | 120 | 80 | |
| B3 | C | 450 | 1 | 10 | 935 | 124 | 84 | |
| B4 | D | 500 | 3 | 19 | 922 | 155 | 75 | |
| B5 | E | 300 | 5 | 21 | 905 | 140 | 84 | |
| B6 | F | 350 | 4 | 27 | 900 | 125 | 85 | |
| B7 | G | 400 | 3 | 19 | 940 | 135 | 85 | |
| B8 | H | 450 | 4 | 10 | 910 | 121 | 81 | |
| B9 | I | 440 | 3 | 11 | 930 | 142 | 92 | |
| B10 | J | 320 | 1 | 13 | 915 | 140 | 80 | |
| B11 | K | 350 | 8 | 19 | 946 | 117 | 77 | |
| B12 | L | 280 | 6 | 17 | 990 | 140 | 80 | |
| B13 | M | 350 | 4 | 21 | 940 | 147 | 87 | |
| B14 | N | 420 | 5 | 19 | 935 | 131 | 81 | |
| B15 | O | 400 | 3 | 26 | 913 | 124 | 84 | |
| B16 | P | 380 | 1 | 29 | 914 | 120 | 80 | |
| B17 | Q | 480 | 7 | 19 | 930 | 150 | 70 | |
| B18 | R | 280 | 3 | 20 | 905 | 117 | 77 | |
| B19 | S | 420 | 2 | 22 | 916 | 119 | 79 | |
| B20 | T | 180 | 1 | 28 | 938 | 92 | 72 | |
| B21 | U | 570 | 1 | 27 | 905 | 55 | 40 | |
| B22 | V | 620 | 3 | 9 | 905 | 60 | 45 | |

TABLE 7

| Weld Metal No. | Steel plate Code | Heat treatment temperature °C. | MA of reheated weld metal Width μm | MA of reheated weld metal Length μm | Mechanical properties of weld metal Tensile strength MPa | vE$_{-40}$ J | vE$_{-60}$ J | Remark |
|---|---|---|---|---|---|---|---|---|
| W1 | A | 350 | 1 | 15 | 1046 | 165 | 120 | Inv. ex. |
| W2 | B | 400 | 2 | 5 | 1027 | 175 | 130 | |
| W3 | C | 450 | 3 | 10 | 985 | 170 | 125 | |
| W4 | D | 500 | 1 | 5 | 948 | 180 | 135 | |
| W5 | E | 300 | 3 | 25 | 1008 | 190 | 145 | |
| W6 | F | 350 | 5 | 15 | 1002 | 169 | 124 | |
| W7 | G | 400 | 1 | 9 | 1021 | 180 | 135 | |
| W8 | H | 450 | 4 | 10 | 1008 | 150 | 105 | |
| W9 | I | 440 | 3 | 7 | 1056 | 169 | 124 | |
| W10 | J | 320 | 2 | 10 | 929 | 170 | 125 | |
| W11 | K | 350 | 1 | 8 | 1074 | 195 | 150 | |
| W12 | L | 180 | 5 | 23 | 1046 | 112 | 87 | |
| W13 | M | 570 | 3 | 20 | 1064 | 75 | 45 | |
| W14 | N | 620 | 5 | 9 | 980 | 55 | 40 | |

Industrial Applicability

According to the present invention, it becomes possible to provide an API standard X120 grade high strength steel pipe for line pipe suppressing the toughness of the HAZ of steel pipe and a method of production of the same and furthermore a high strength steel plate for line pipe able to be used as a material for high strength steel pipe for line pipe and a method of production of the same.

The invention claimed is:

1. A high strength steel pipe for line pipe superior in low temperature toughness characterized by comprising a steel plate shaped into a tube with seam portions of the steel plate welded by one layer each at the inner side and outer side, wherein a base metal of the steel pipe has a chemical composition containing, by mass %,
   C: 0.020 to 0.080%,
   Si: 0.01 to 0.50%,
   Mo: 0.01 to 0.09%,
   Al: 0.0005 to 0.030%, and
   Nb: 0.013 to 0.030%
in a range of
   C+0.25Si+0.1Mo+Al+Nb: 0.100% or less
further containing,
   Mn: 1.50 to 2.50%,
   Ti: 0.003 to 0.030%, and
   B: 0.0001 to 0.0030%, and
limiting
   P: 0.020% or less and
   S: 0.0030% or less,
with the balance of Fe and unavoidable impurities, a mixture of austenite and martensite present along prior austenite grain boundaries of reheated parts of a heat affected zone having a width of 10 μm or less and a length of 50 μm or less and wherein the weld metal has a chemical composition containing, by mass %,
   C: 0.010 to 0.100%,
   Si: 0.01 to 0.50%,
   Mn: 1.00 to 2.00%,
   Ni: 1.30 to 3.20%,
   Al: 0.0005 to 0.100%,
   Ti: 0.003 to 0.050%, and
   O: 0.0001 to 0.0500%
further containing
   a total of one or more of Cr, Mo, and V: 1.00 to 2.50%,
limiting
   P: 0.020% or less and
   S: 0.0100% or less
with the balance of Fe and unavoidable impurities.

2. A high strength steel pipe for line pipe superior in low temperature toughness as set forth in claim 1 characterized in that the base metal has a tensile strength in the circumferential direction of 900 MPa or more.

3. A high strength steel pipe for line pipe superior in low temperature toughness as set forth in claim 1 characterized in that the weld metal has a chemical composition further containing, by mass %, B: 0.0001 to 0.0050%.

4. A high strength steel pipe for line pipe superior in low temperature toughness as set forth in claim 1 characterized in that the base metal has a chemical composition further containing, by mass %, one or both of
   Cu: 0.05 to 1.50% and
   Ni: 0.05 to 5.00%.

5. A high strength steel pipe for line pipe superior in low temperature toughness as set forth in claim 1 characterized in that the base metal has a chemical composition further containing, by mass %, one or more of
   Cr: 0.02 to 1.50%,
   W: 0.01 to 2.00%,
   V: 0.010 to 0.100%,
   Zr: 0.0001 to 0.0500%, and
   Ta: 0.0001 to 0.0500%.

6. A high strength steel pipe for line pipe superior in low temperature toughness as set forth in claim 1 characterized in that the base metal has a chemical composition further containing, by mass %, one or more of
   Mg: 0.0001 to 0.0100%,
   Ca: 0.0001 to 0.0050%,
   REM: 0.0001 to 0.0050%,
   Y: 0.0001 to 0.0050%,
   Hf: 0.0001 to 0.0050%, and
   Re: 0.0001 to 0.0050%.

7. A method of production of the high strength steel pipe for line pipe superior in low temperature toughness as set forth in claim 1, said method of production characterized by melting and casting steel comprising the chemical composition as set forth in claim 1 into a steel slab, reheating the steel slab to 1000° C. or more, hot rolling by a reduction ratio in a nonrecrystallization temperature region of 3 or more to form a steel plate, water cooling, stopping water cooling at 500° C. or lower, shaping the steel plate into a tube, welding the seam potions to produce a pipe, and then enlarging the pipe.

8. A method of production of high strength steel pipe for line pipe superior in low temperature toughness as set forth in claim 7 characterized by shaping the steel plate into a tube by a UO process, welding the seam portions from the inner side and outer side by submerged arc welding to produce the pipe, then enlarging the pipe.

9. A method of production of a high strength steel pipe for line pipe superior in low temperature toughness as set forth in claim 8 wherein a welding wire used for the submerged arc welding has a chemical composition containing, by mass %,
   C: 0.01 to 0.12%,
   Si: 0.05 to 0.50%,
   Mn: 1.00 to 2.50%, and
   Ni: 2.00 to 8.50%
further containing one or more of Cr, Mo, and V in a range of
   Cr+Mo+V: 1.00 to 5.00%
with a balance of Fe and unavoidable impurities.

10. A method of production of high strength steel pipe for line pipe superior in low temperature toughness as set forth in claim 9, the chemical composition of the welding wire further containing, by mass %, B: 0.0001 to 0.0050%.

11. A method of production of high strength steel pipe for line pipe superior in low temperature toughness as set forth in claim 7 further comprising heat treating the weld zone and heat affected zone after welding and before pipe expansion.

12. A method of production of high strength steel pipe for line pipe superior in low temperature toughness as set forth in claim 11 wherein the heating temperature of heat treating the weld zone and heat affected zone is 200 to 500° C.

* * * * *

UNITED STATES PATENT AND TRADEMARK OFFICE
CERTIFICATE OF CORRECTION

PATENT NO.       : 8,764,918 B2
APPLICATION NO.  : 12/308677
DATED            : July 1, 2014
INVENTOR(S)      : Takuya Hara et al.

It is certified that error appears in the above-identified patent and that said Letters Patent is hereby corrected as shown below:

In the Specification

Column 10, line 14, change "when the amount of 0 remains" to -- when the amount of O remains --;

Column 11, line 48-49 (formula 2), change "Pcm = C+ Si/30 + (Mn+Cu+Cr)/20 + Ni/60 + Mo/15 + V/10 + 5 × 13" to -- Pcm = C+ Si/30 + (Mn+Cu+Cr)/20 + Ni/60 + Mo/15 + V/10 + 5 × B --.

Signed and Sealed this
Tenth Day of February, 2015

Michelle K. Lee
*Deputy Director of the United States Patent and Trademark Office*